July 3, 1962 J. McINROY 3,041,878
HYGROMETERS
Filed Dec. 7, 1959 2 Sheets-Sheet 1

Inventor
J. McInroy

July 3, 1962 J. McINROY 3,041,878
HYGROMETERS

Filed Dec. 7, 1959 2 Sheets-Sheet 2

Inventor
J. McInroy
By Elmer Downing Neble
Attys.

3,041,878
HYGROMETERS
John McInroy, Whitnash, Leamington Spa, England, assignor to The Hymatic Engineering Company Limited, Redditch, England, a company of Great Britain
Filed Dec. 7, 1959, Ser. No. 857,643
Claims priority, application Great Britain Dec. 8, 1958
6 Claims. (Cl. 73—335)

This invention relates to hygrometers for testing the moisture content of gases.

Known hygrometers of the expansion type, wherein adiabatic expansion of the gas under test within an observation chamber causes self-cooling of the gas to its dew-point, have several limitations in that they cannot be used directly with high pressure gases. Also the chamber has to be pressurised by a manually operated pump which tends to contaminate the gas and considerable hand purging of the hygrometer has to be undertaken before stable conditions can be established.

An object of the present invention is to provide an improved hygrometer in which these limitations are mitigated.

According to the invention, a hygrometer comprises an observation chamber adapted to be pressurised by the gas to be tested and then exhausted, said chamber being provided with means to illuminate the chamber with a beam of light enabling mist formed in the chamber to be observed directly or indirectly, and a multi-stage restrictor valve comprising a plurality of needle valves, through which the gas to be tested is supplied to the observation chamber. For continuous observation the chamber may automatically be exhausted to atmosphere at regular intervals or alternatively the exhaust valve may be operated manually each time a measurement is required. Observation of the mist formed may be visual or by photoelectric means.

The multi-stage restrictor valve enables gases at high pressures to be tested, the reduction of pressure at each needle valve being arranged to be less than that which would give local reductions in temperature below the dew point and freeze out the small traces of moisture present.

Figure 1:
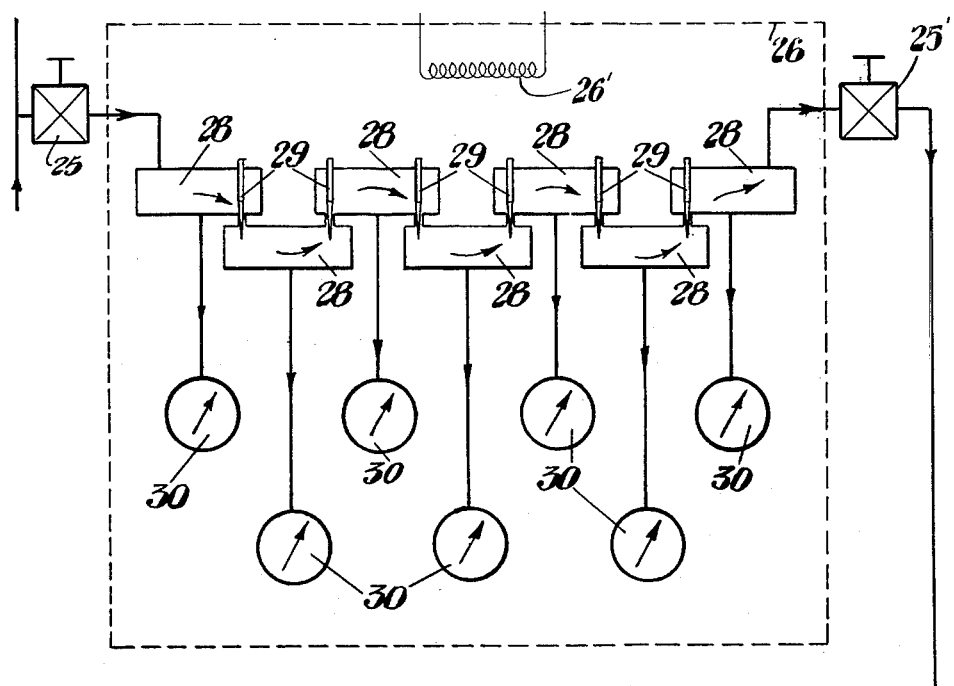
Figure 1:
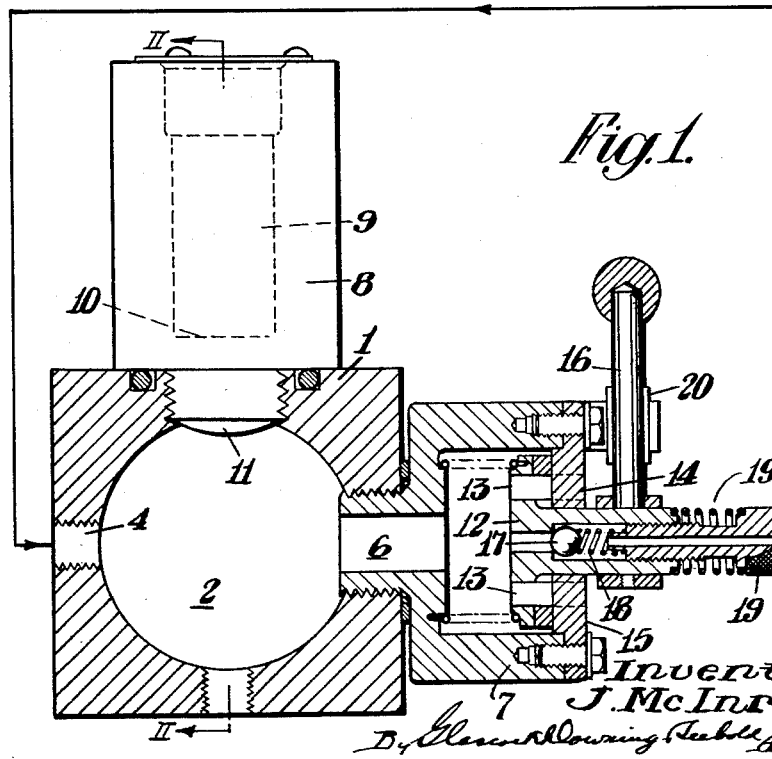
Figure 2:
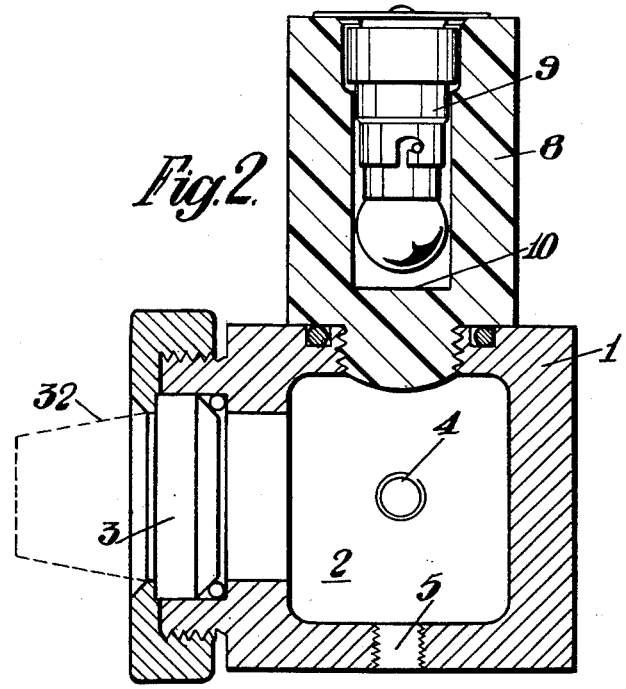
Figure 3:
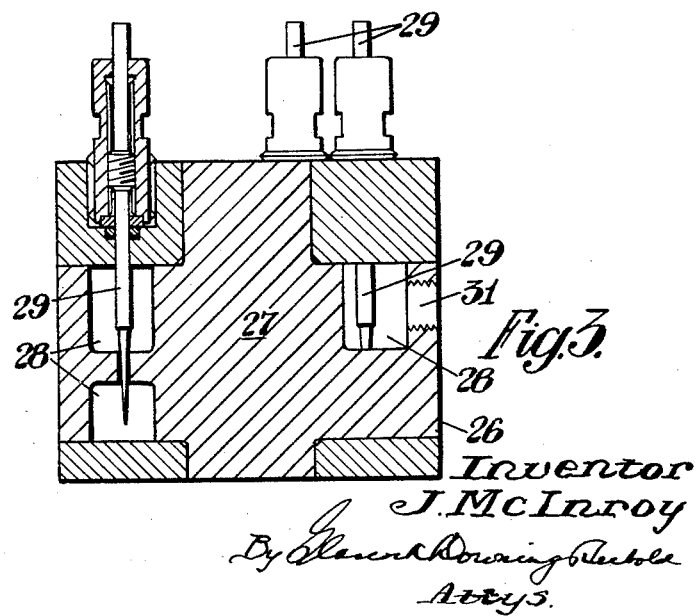

Referring to the accompanying drawings:

FIGURE 1 shows, partly schematically and partly in section, a hygrometer in accordance with the invention, FIGURE 2 is a sectional view of the observation chamber taken on the line II—II of FIGURE 1, and FIGURE 3 is a sectional view of the multistage restrictor valve shown schematically in FIGURE 1.

In the hygrometer, the observation chamber comprises a rectangular metal block 1 having an internal cylindrical cavity 2 one end of which penetrates one wall and is closed by a gas-tight observation window 3. Three ports are provided, an inlet port 4 for the entry of the gas to be tested, a port 5 for communication with a pressure gauge (not shown) and an exhaust port 6 which carries a manually operated exhaust valve 7. A hollow transparent plastic cylinder 8, carrying an electric lamp 9 is screwed into another wall of the chamber, the whole of which cylinder is painted black (internally and externally) except for two surfaces 10 and 11 which, in combination with the material between, form a lens system throwing a parallel beam of light from the lamp 9 into the chamber. The interior of the chamber is also painted matt black to reduce internal reflection to a minimum. When a mist is formed in the chamber this is readily observed through the window as the particles of moisture deflect the light beam.

The exhaust valve 7 comprises a rotatable disc 12 having ports 13 which are brought into line with ports 14 on the end cover 15 when a lever 16 is operated rotationally and allow free and rapid exit of any pressurised gas in the chamber. The exhaust valve 7 also includes a relief valve mechanism, comprising a ball 17 held to its seat by a spring 18, the compression of which is manually adjustable by a knurled headed screw 19 against the tension of a spring 19'.

A microswitch 20 abuts the exhaust valve lever 16 so that the initial movement of the lever causes the microswitch to complete an electric circuit to the lamp causing the latter to cast a beam of light into the observation chamber.

The high pressure gas to be tested is fed to the chamber through a stop valve 25 which in turn is connected to a multi-stage restrictor valve 26 shown schematically in FIGURE 1 and in section in FIGURE 3. The valve 26 comprises a steel block 27 having cavities 28 therein, which are interconnected in series by six threadably adjustable needle valves 29. The number of adjustable needle valves required is dependant upon the inlet pressure. For example, for pressures greater than 3000 pounds per square inch, it may be necessary to provide a greater number of needle valves, the requirement being that the reduction of pressure of each needle valve is less than that which gives local reductions in temperature below the dew point. A pressure gauge 30 is connected to each cavity at port 31 to register the pressure therein. From the valve 26 the gas passes through an outlet valve 25' to the observation chamber. A heating coil 26' may be provided to maintain the valves at a desired temperature.

In operation, gas is allowed to pressurise the observation chamber to a level recorded on the chamber pressure gauge (not shown) as set by the manually adjustable relief valve 17. Movement of the exhaust valve lever 16 lights the lamp 9 and simultaneously exhausts the chamber rapidly to atmospheric pressure. This rapid drop in pressure within the chamber causes an adiabatic temperature drop, the magnitude of which is dependent upon the initial pressure. By gradually increasing the initial pressure in the chamber after each successive exhausting, a point is reached where a cloud or fog is observed within the chamber. Noting the pressure at which this cloud just forms, the dew point and hence the moisture content can be read off from a table or graph of corresponding values.

In circumstances where it is required to have an automatic monitoring system, this may be arranged as follows.

The observation chamber is arranged to have the light and the window at opposite ends of the cylindrical cavity. External to the chamber and adjacent the window is set a photo-electric cell (not shown) so that the light from the source passes through the chamber and falls upon the sensitive element of the photo-cell. The gas in the chamber is maintained at a predetermined pressure level and the exhaust valve made to open at set regular intervals of time by electrical or mechanical means. The light source may be continuously maintained or made to light a few seconds before each exhausting operation. The photo-electric cell may be in circuit with a device (not shown) which, upon receiving a reduced strength of signal due to mist forming in the chamber, operates an alarm system, or causes controls to be operated, or operates a recording device or any combination of these operations.

Two photo-electric cells may be used, one receiving light through the chamber and the other receiving light directly from the source. By suitably placing the cells in a Wheatstone bridge circuit, any difference in the received light due to the formation of mist is readily detected.

In the foregoing it has been assumed that the function of the hygrometer is to detect the presence of moisture if this should rise beyond a prescribed limit and that this can be observed visually directly or indirectly, or made to operate automatically controls in a system. It may be, however, that a gas used in a process or for certain operations, should not be permitted to fall below a certain wetness, i.e. there is a limit to the dryness required. In this case the described apparatus could, with adjustments, be made to fulfil these requirements.

The instrument can also be applied where gases require to be controlled within limits of moisture content. Two instruments may then be used, one to function when the gas exceeded the upper limit of moisture content and the other to function when the gas exceeded the lower limit of moisture content.

Experience has shown that dew point observations for values between −60° C. and −80° C. depend upon the speed of operation of the exhaust valve. If this is too rapid, fog has not time to form and be observed. An additional refinement would, therefore, be a damping device to control the rate of opening of the exhaust valve. For these low dew points it is also desirable to fit to the window an eye piece 32 (shown in broken line in FIGURE 2) so that extraneous light is kept from the eye of the observer.

Heating fins or low capacity electric heating strips may be provided around the multi-stage restrictor valve 26 to heat the body and counteract the effect of the Joule-Thomson cooling at each stage of pressure reduction. By so doing, it is possible to reduce the number of throttling stages in some instances.

When measuring very low dew points in the region of −80° C., the moisture content is very rarefied and observation of the mist can be improved by expanding the air in the chamber at a higher pressure.

For example, the exhaust valve can be made to communicate on the down-stream side with a cylinder of gas, say, at one atmosphere gauge pressure. The initial pressure in the chamber is thereby doubled to keep the expansion pressure ratio the same as before. In consequence, the fog density is doubled and therefore more easily observed.

The same effect can also be obtained by introducing a back pressure valve in the chamber exhaust system in such a manner that, upon exhausting the chamber, the valve will close when a predetermined level of pressure has been reached in the chamber.

What is claimed is:

1. A hygrometer comprising an observation chamber adapted to be pressurised by the gas to be tested from a source and then exhausted, said chamber being provided with means to illuminate the chamber with a beam of light enabling mist formed in the chamber to be observed directly or indirectly, and a multistage restrictor valve comprising a plurality of needle valves arranged in sequence between the source and chamber and through which the gas to be tested is supplied to the observation chamber, each of the valves providing a reduction in the pressure of the gas without a reduction in the local temperature below the dew point thereof.

2. A hygrometer as claimed in claim 1 wherein the restrictor valve comprises a block having cavities therein, said cavities being interconnected in series by the needle valves, said needle valves being adjustable, and said cavities each being provided with a port for connection of a pressure gauge to each cavity.

3. A hygrometer as claimed in claim 1, wherein the restrictor valve is provided with heating means.

4. A hygrometer comprising an observation chamber adapted to be pressurised by the gas to be tested from a source and then exhausted, said chamber being provided with means to illuminate the chamber with a beam of light enabling mist formed in the chamber to be observed directly or indirectly, a multi-stage restrictor valve comprising a plurality of needle valves arranged in sequence between the source and chamber and through which the gas to be tested is supplied to the observation chamber, a valve chamber opening into the observation chamber and having an end wall provided with at least one port, and a rotatable disc within the valve chamber having at least one port for registration with the port in the end wall for exhausting the observation chamber.

5. A hygrometer as claimed in claim 4, wherein coaxial with the exhaust valve there is provided an adjustable relief valve mechanism.

6. A hygrometer comprising an observation chamber adapted to be pressurized by the gas to be tested from a source and then exhausted, said chamber being provided with means to illuminate the chamber with a beam of light enabling mist formed in the chamber to be observed directly or indirectly, and a multi-stage restrictor valve comprising a plurality of needle valves arranged in sequence between the source and chamber and through which the gas to be tested is supplied to the observation chamber, wherein the beam of light to illuminate the observation chamber comprises a transparent plastic housing accommodating an electric lamp, the plastic housing having a threaded end portion which screws into a threaded port in the wall of the chamber, the threaded portion forming a lens system and the remainder of the housing surface being painted black.

References Cited in the file of this patent

UNITED STATES PATENTS

| | | |
|---|---|---|
| 2,566,307 | Boyle | Sept. 4, 1951 |
| 2,654,242 | Fallgatter et al. | Oct. 6, 1953 |
| 2,912,011 | Burg | Nov. 10, 1959 |
| 2,979,895 | Haase et al. | Apr. 18, 1961 |